United States Patent
Wong et al.

(10) Patent No.: US 6,614,423 B1
(45) Date of Patent: Sep. 2, 2003

(54) TOUCH-PAD COVER PROTECTING AGAINST WEAR, SPILLS AND ABUSE

(75) Inventors: Kyin Pauk Wong, San Francisco, CA (US); Siltex Peter Yuen, San Jose, CA (US); Llavanya Fernando, San Jose, CA (US); Eric A. Bunn, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 209 days.

(21) Appl. No.: 09/710,364

(22) Filed: Nov. 7, 2000

Related U.S. Application Data

(60) Provisional application No. 60/226,796, filed on Aug. 21, 2000.

(51) Int. Cl.[7] .................................................. G09G 5/00
(52) U.S. Cl. ....................................... 345/173; 361/683
(58) Field of Search .......................... 345/173; D14/345; 361/681, 683

(56) References Cited

U.S. PATENT DOCUMENTS 6,122,162 A * 9/2000 Horie et al. ................ 361/683
6,163,313 A * 12/2000 Aroyan et al. .............. 345/173
6,262,717 B1 * 7/2001 Donohue et al. ........... 345/173

* cited by examiner

*Primary Examiner*—Kent Chang
*Assistant Examiner*—Tom V. Sheng
(74) *Attorney, Agent, or Firm*—Dorsey & Whitney LLP

(57) ABSTRACT

Apparatus for protecting a touch pad against wear, spills and abuse. An apparatus may include a cover for placement over a touch pad and adhesive, adhering to the cover, not adhering to the touch pad and for adhering to a surface surrounding the touch pad. The cover may have upper and lower surfaces. Then the adhesive adheres to the lower surface of the cover. An apparatus may include a touch pad with x and y orthogonal dimensions and at least one edge in each dimension, an overlay above the touch pad and with the touch pad forming a contour, and a plastic-film cover, above and adhering to the overlay, fitting the contour of the touch pad and overlay and covering two edges of the touch pad in each of the x and y dimensions. An edge of the touch pad may be the line at which the touch pad becomes accessible from under any overlying material.

12 Claims, 5 Drawing Sheets

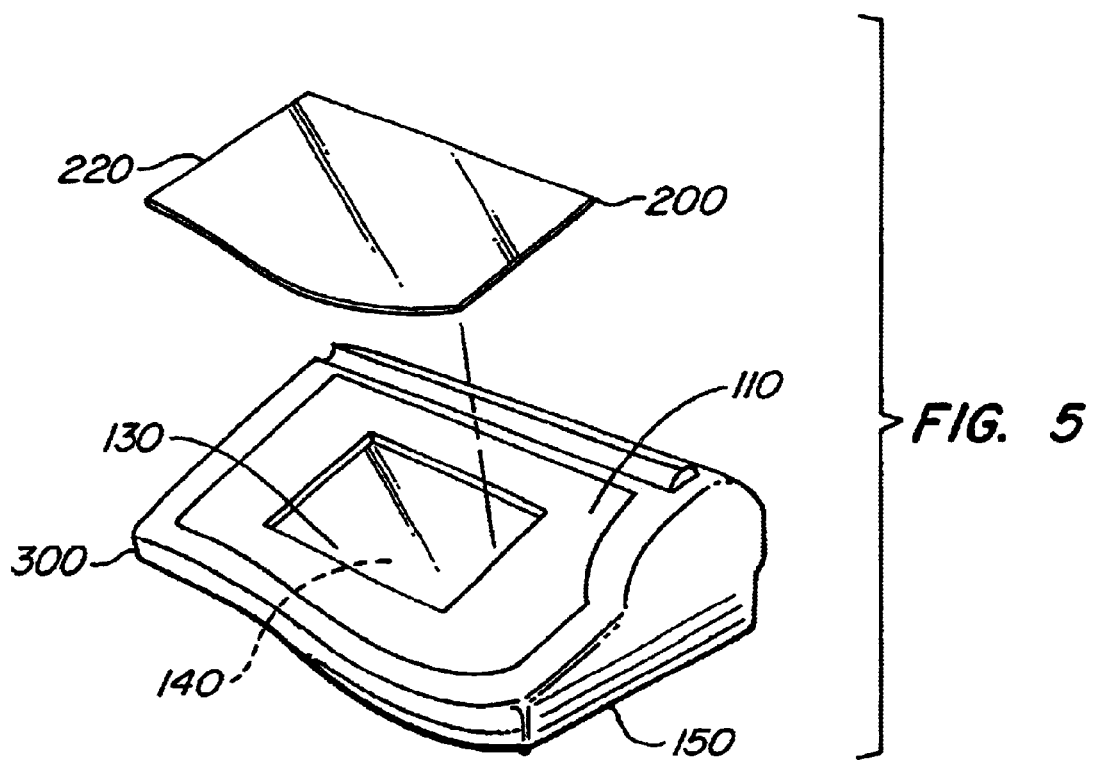

TOUCH-PAD COVER PROTECTING AGAINST WEAR, SPILLS AND ABUSE

This application claims the benefit of the filing date(s) of the following earlier application(s):

U.S. Patent Application No. 60/226,796, entitled, "A Touch-Pad Cover Protecting Against Wear, Spills and Abuse," filed Aug. 21, 2000, naming Kyin Pauk Wong, Siltex Peter Yuen, Llavanya Fernando and Eric A. Bunn as inventors, and commonly assigned to @POS.COM of San Jose, Calif.

U.S. Patent Application No. 60/226,796 is incorporated by reference herein.

This invention relates to point-of-sale or point-of-service (POS) terminals and protective coverings for the same. More specifically, this invention relates to a cover for a touchscreen of a POS terminal, the cover protecting against wear, abuse and spillage.

BACKGROUND

FIG. 1 illustrates a transaction computer 100 of the art. The transaction computer 100 includes an overlay 110, a cover 120, a touch pad 130, a display 140 and a substrate 150. The display 140 lies in the substrate 150. The touch pad 130 lies above and on the display 140. The transparent cover 120 lies above the touch pad 130.

The overlay 110 lies above and on the cover 120. The overlay 110 includes an opening 111 coinciding with the position of the cover 120 and touch pad 130 beneath it. (For clarity, the overlay 110 and the cover 120 are illustrated both in situ in the transaction computer (TC) 100 and out of position hovering above the TC 100.)

The display 140 is a liquid crystal display (LCD). It typically cooperates with the touch pad 130 to create a touchscreen.

The screen protectors with reorder nos. 60027-250 and 0033-250, available from the assignee of the instant invention, are examples of the prior-art cover 120.

The procedure for installing the cover 120, however, limits its effectiveness. FIG. 2 illustrates the installation of a cover 120. The cover 120 is slid under the overlay 110 in the X axis or in the Y axis.

The edges of the cover 120 extend over the edges of the touch pad 130 in the X axis when the overlay is inserted along the X axis and extend over the edges of the touch pad 130 in the Y axis when it is inserted along the Y axis. Notably, the cover 120 does not cover the edges of the touch pad 130 in both the X and Y axes. (The "edge" of the touch pad #__130 is the line at which the touch pad #__130 becomes visible through the overlay #__110.)

Accordingly, in day-to-day use, the touch-pad stylus, users' fingernails, etc. may wear the exposed edges of the touch pad 130. Malicious users may intentionally damage the touch pad 130 by poking into and prying along its unprotected edges.

Liquids may spill onto the transaction computer 100. While the cover 120 may help to prevent the spilled liquid's moving into the transaction computer 100 along one axis (the axis of the cover 120's insertion), the cover 120 does nothing to prevent the liquid's movement into the exposed edges of the touch pad 130 (along the axis orthogonal to the axis of insertion) and into the electronics of the transaction computer 100 from there.

Indeed, the prior-art cover 120 even has an unintended side affect. While the cover 120 diverts a spilled liquid away from the protected edges of the touch pad 130, the liquid must still go somewhere. The cover 120 has the effect of diverting the liquid to the protected edges of the touch pad 130 and into the electronics of the transaction computer 100 from there.

Accordingly, more complete protection of the touch pad 130 and the underlying components of the transaction computer 100 is sought.

These and other goals of the invention will be readily apparent to one of ordinary skill in the art on reading the background above and the description below.

SUMMARY

Herein are taught apparatus for protecting a touch pad against wear, spills and abuse. An apparatus may include a cover for placement over a touch pad and adhesive, adhering to the cover, not adhering to the touch pad and for adhering to a surface surrounding the touch pad. The cover may have upper and lower surfaces. Then the adhesive adheres to the lower surface of the cover.

An apparatus may include a touch pad with x and y orthogonal dimensions and at least one edge in each dimension, an overlay above the touch pad and with the touch pad forming a contour, and a plastic-film cover, above and adhering to the overlay, fitting the contour of the touch pad and overlay and covering two edges of the touch pad in each of the x and y dimensions. An edge of the touch pad may be the line at which the touch pad becomes accessible from under any overlying material.

BRIEF DESCRIPTION OF THE DRAWINGS

FIG. 5 illustrates a touchscreen cover according to one embodiment of the invention.

(The drawings are not to scale.)

DESCRIPTION OF THE INVENTION

Figure 1:
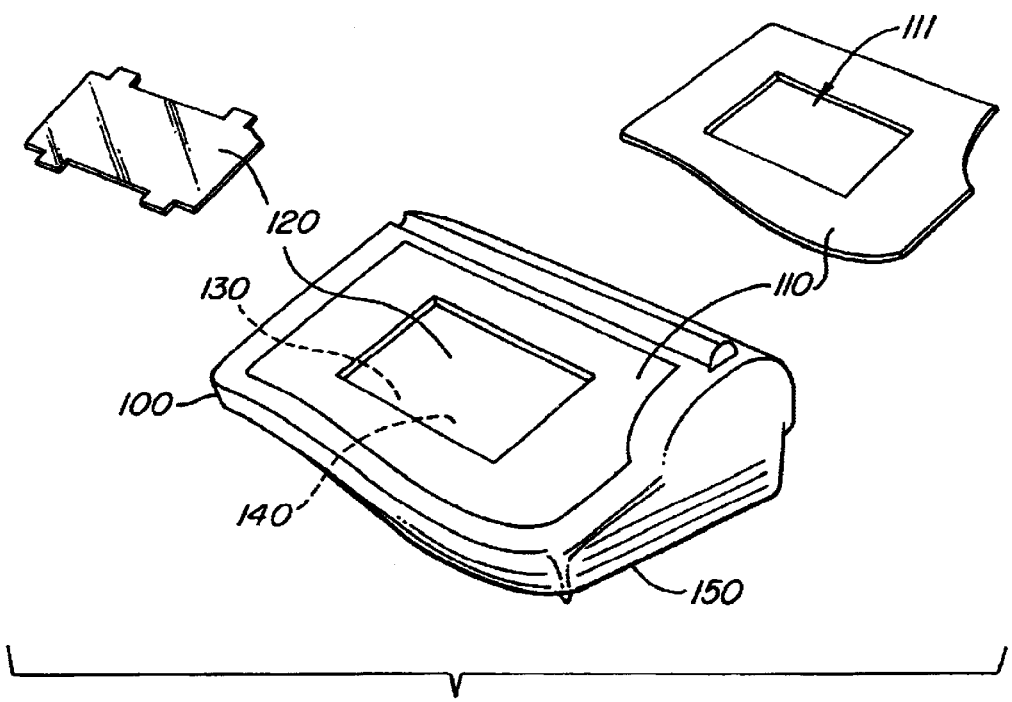
FIG. 1 illustrates a prior-art protective cover for a POS terminal.
Figure 2A:
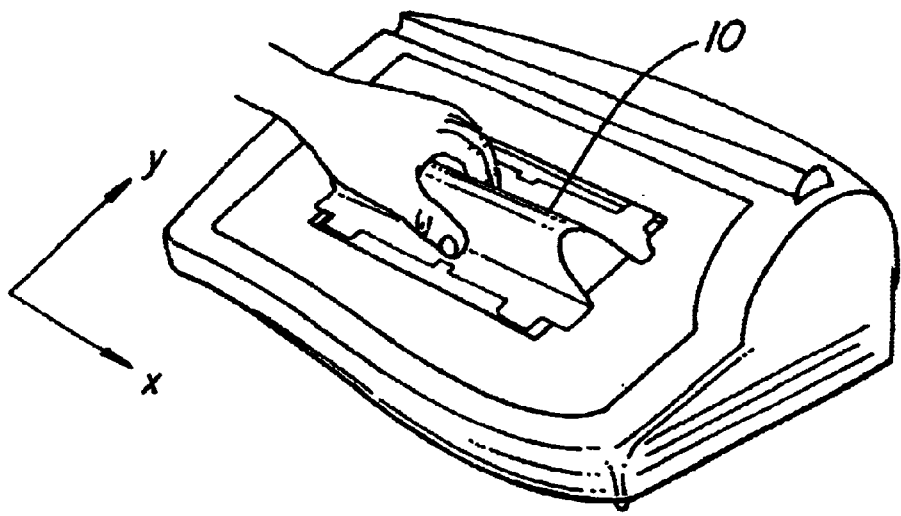
FIG. 2 illustrates the installation of a cover of the prior art.
Figure 2B:
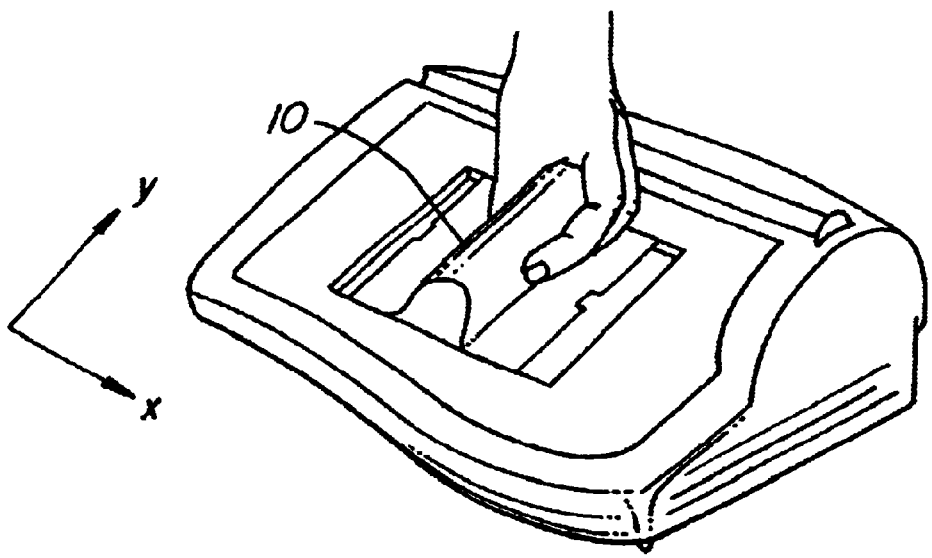

FIG. 5 illustrates a touchscreen cover 200 according to one embodiment of the invention. The cover 200 is in a pre-installation position, above its installed position above (and preferably adjacent) a prior-art transaction computer 300.

The transaction computer (TC) 300 may be identical to the prior-art transaction computer 100—except that the TC 300 typically does not include a cover 120, although it may. FIG. 5 shows the overlay 110, the touch pad 130, the display 140 (visible through the touch pad 130) and the substrate 150. As before, the display 140 and the touch pad 130 may cooperate to create a touchscreen.

As FIG. 5 shows, the cover 200 may be a plane 220 of material and may have the shape of the overlay 110 of the TC 300. The cover 200 may extend beyond edges of the touchscreen, where a touchscreen edge is defined as the line where the touchscreen becomes accessible from under the overlay 110. A touchscreen edge may alternatively be defined as a physical extent of the touchscreen.

The cover 200 may be made of a plastic film. The cover may be a hard-coated polycarbonate film, such as a MAR- NOT™ film from Tekra Corp., New Berlin, Wis. (The film may be labeled.)

When installed on the TC 300, the cover 200 may adhere to the TC 300 by electrostatic charge, by magnetization, by adhesive, etc.

Figure 3A:
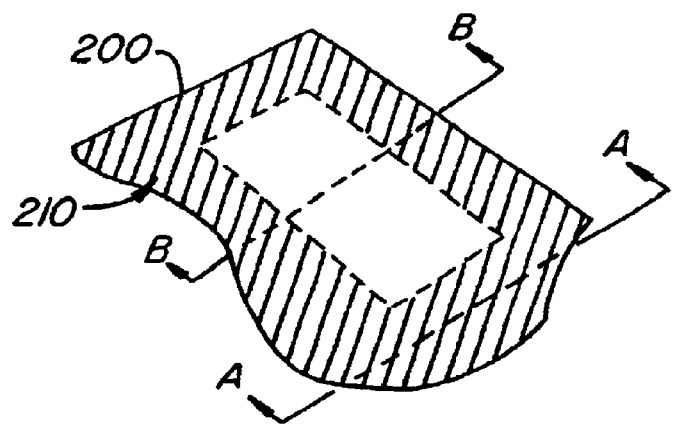
FIGS. 3A–3C illustrate an embodiment the cover according to the invention, as well as two cross sections of that embodiment.
Figure 3B:
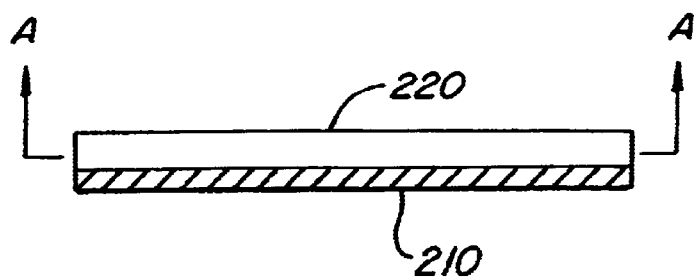
Figure 3C:
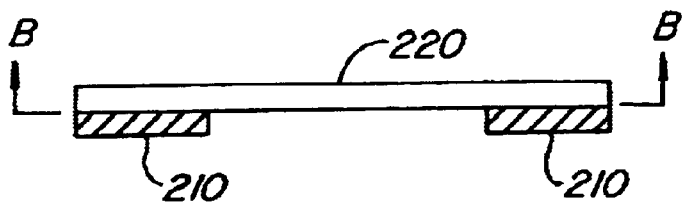

FIGS. 3A–3C illustrate an embodiment of the cover 200 according to the invention, as well as two cross sections of that embodiment. FIG. 3A shows the embodiment from a viewpoint above and to the right of the cover 200 as installed. FIG. 3A also shows cross-section lines A—A and B—B. FIG. 3B shows the cross section of the cover 200 at the line A—A of FIG. 3A. Similarly, FIG. 3C shows the cross section of the cover 200 at the line B—B of FIG. x3B.

In FIG. 3A, the cover 200 has an adhesive 210 applied to its lower surface. The adhesive 210 may be applied to substantially all of the underside of the cover 200 not contacting the touch pad 130 of the TC 300.

The line A—A bisects the plane 220 of the cover 200 where the adhesive 210 extends the breadth of the plane 220. Accordingly, the cross section of FIG. 3B shows the plane 220 and the adhesive 210 extending along its breadth.

The line B—B bisects the plane 220 of the cover 200 where the adhesive 210 is not applied to the portion of the cover 200 corresponding to the touchscreen of the TC 300. Accordingly, the cross section of FIG. 3C shows the plane 220 and the adhesive 210 extending inward from the edges of the cover 200 but stopping before reaching the portion of the cover 200 to be placed over the touch pad 130 of the TC 300.

Figure 4A:
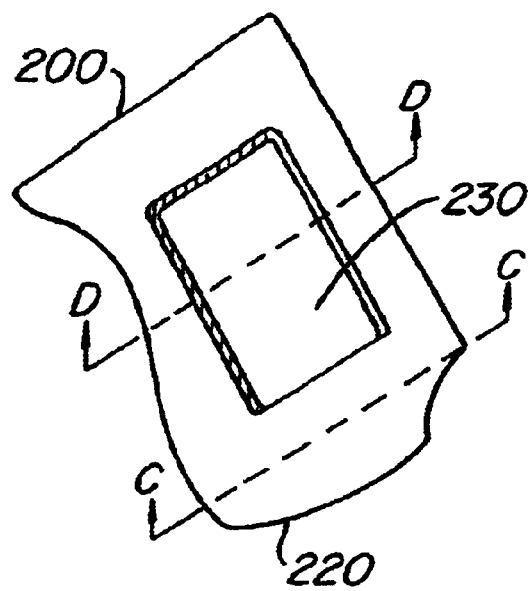
FIGS. 4A–4C illustrate another embodiment of the cover and two cross sections of that embodiment.
Figure 4B:
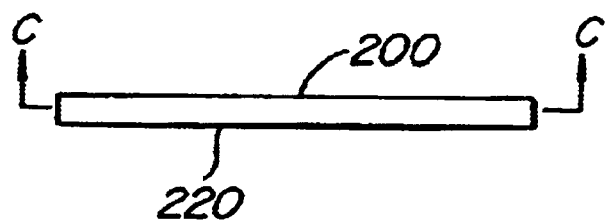
Figure 4C:
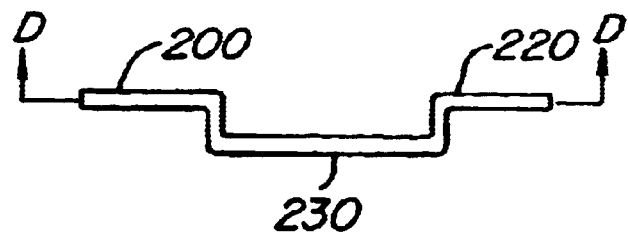

FIGS. 4A–4C illustrate another embodiment of the cover 200 and two cross sections of that embodiment. FIG. 4A shows the embodiment from a viewpoint above and to the right of the cover 200 as installed. FIG. 4A also shows cross-section lines C—C and D—D. FIG. 4B shows the cross section of the cover 200 at the line C—C of FIG. 4A. Similarly, FIG. 4C shows the cross section of the cover 200 at the line D—D of FIG. 4B.

The surface of the overlay 110 of the TC 300 may be above (closer to the user than) the surface of the touchscreen of the TC 300. Accordingly, as shown in FIG. 4A, a portion 230 of the cover 200 may be lower (recessed and further from the user) than the remainder of the cover 200. In other words, the portion 230 of the cover 200 overlying the touch pad 130 may be lower than the plane 220 of the rest of the cover 200.

The line C—C bisects the plane 220 of the cover 200 where the recessed portion of the cover does not interrupt the plane 220 of the cover 200. Accordingly, the cross section of FIG. 4B shows the uninterrupted breadth of the plane 220.

The line D—D bisects the plane 220 of the cover 200 where the recessed area interrupts the plane 220 of the cover 200. Accordingly, the cross section of FIG. 4C shows the recessed portion 230 interrupting the plane 220 near its center.

The invention now being fully described, many changes and modifications that can be made thereto without departing from the spirit or scope of the appended claims will be apparent to one of ordinary skill in the art. For example, the cover 200 may have both an adhesive 210 as illustrated in FIGS. 3A–3C and the recessed area 230 illustrated in FIGS. 4A–4C.

What is claimed is:

1. A touch pad protected against its environment, the touch pad comprising:

a touch pad forming a contour and having x and y orthogonal dimensions and at least one edge in each of said dimensions, and having a physical extent of said touch pad defined by an edge thereof;

a cover disposed above said touch pad and covering an edge thereof in each of said x and y dimensions; and an overlay disposed between said touch pad and and said cover;

wherein said cover fits said contour of said touchpad and said overlay and covers said touch pad and at least a portion of said overlay.

2. The touch pad of claim 1, wherein said edge of said touch pad defines a line at which said touch pad becomes accessible.

3. The touch pad of claim 1, wherein said cover covers two edges of said touch pad.

4. The touch pad of claim 1, wherein said cover covers two edges of said touch pad.

5. The touch pad of claim 1, wherein: said overlay has outer edges defining a physical extent of said overlay, and said cover covers at least one of said outer edges of said overlay.

6. The touch pad of claim 1, wherein: said overlay has outer edges defining a physical extent thereof and has inner edges through which said touch pad is accessible.

7. The touch pad of claim 1, wherein said cover includes a waterproof plastic film.

8. The touch pad of claim 1, wherein said cover includes a plastic film.

9. The touch pad of claim 1, wherein said cover includes a polycarbonate film.

10. The touch pad of claim 1, wherein said cover adheres to at least a portion of said overlay.

11. The touch pad of claim 1, wherein said cover is adhered to at least a portion of said overlay.

12. A touch pad protected against its environment, the touch pad comprising:

a touch pad having x and y orthogonal dimensions and having at least one edge in each dimension;

an overlay disposed above said touch pad so as to form a contour with said touchpad;

a plastic-film cover, disposed above and adhering to said overlay, fitting said contour of said touch pad and overlay and covering two edges of said touch pad in each of the x and y dimensions, wherein an edge of said touch pad defines a line at which said touch pad becomes accessible.

\* \* \* \* \*